Patented June 29, 1948

2,444,296

UNITED STATES PATENT OFFICE 2,444,296

RECOVERY OF GLYCEROL

Gerald Inman Keim, Newark, and John Ross, Ramsey, N. J., and Joseph Henry Percy, New York, N. Y., assignors to Colgate-Palmolive-Peet Company, Jersey City, N. J., a corporation of Delaware No Drawing. Application April 24, 1943, Serial No. 484,484

9 Claims. (Cl. 260—637)

The present invention relates to a process for refining glycerine and, more particularly, to an improved process for recovering glycerol and polyglycerols from glycerine foots.

Glycerine has been an important by-product of soap manufacture for many years. Saponification of fats and oils is generally carried out by intimately mixing the fats and oils with alkaline agents and heating the mixture with agitation to form soap and glycerine. After completition of the reaction, soap is commonly salted out, leaving glycerine in solution and thus separating it from the soap. Successive washings are usually employed to remove the glycerine, and the glycerine, as thus recovered, is in about 5% to about 10% or higher solution, the solution being known as "spent lye." Soap dissolved in the spent lye is then precipitated, as with a soluble iron or aluminum salt; the liquid is filtered, concentrated to about 80% glycerine and freed from separated salt, and the glycerine is distilled off. A quantity of polyglycerols (i. e., diglycerol and higher polyglycerols) is formed during the process for recovering glycerol, including its commercial distillation, and the distillation is usually carried to a point where it is impractical commercially and industrially to try to remove further glycerol from the polyglycerols. A considerable proportion of the glycerol amounting to some 3% to 7% of the total originally available in the oil, depending upon the efficiency of operation, is usually lost in the glycerine foots.

It is an object of the present invention to provide a novel process for recovering high yields of glycerine from glycerine crudes.

It is also an object of the invention to provide an improved process for treating glycerine foots whereby the glycerine content thereof may be separated relatively free from polyglycerols.

Another object of this invention is to provide a new method of treating glycerine foots whereby glycerol and polyglycerols contained therein can be separately recovered from the salt and soap content of the foots.

Other objects and advantages of the invention will be apparent from the following description.

According to the present invention, glycerine foots, resulting from distillation of crude glycerine solutions and containing glycerol and polyglycerols, are treated with a solvent, comprising an alcohol having three to about six carbon atoms per molecule, with which glycerol is miscible but with which the polyglycerols are relatively insoluble at the temperature of treatment. The alcohol extract is separated from the raffinate, the alcohol is then removed, and glycerol is obtained relatively free from other materials. When salt and soap are also present in the foots, as is the case when the glycerine is a product of the usual soap-making process, a solvent for the glycerol and polyglycerols and in which salt is, at most, only slightly soluble is contacted either with the mixture before extraction with the aforementioned solvent or with the raffinate after extraction therewith; this permits separate recovery of the polyglycerols.

In treating glycerine foots resulting from the distillation of crude glycerol obtained by working up spent lye in a soap-making process, the separation of glycerol and polyglycerols may be carried out by extracting the foots with a solvent comprising an alcohol having not more than two carbon atoms per molecule (i. e., methanol and/or ethanol), which dissolves both glycerol and polyglycerols and leaves behind all but a small proportion of sodium chloride, sodium sulphate and other salts. The solvent is removed by evaporation or distillation to leave a residue containing glycerol and polyglycerols with less than 4% of the salt originally present in the foots. This residue is then extracted with a second solvent comprising an alcohol having three to about six carbon atoms per molecule at a temperature at which said alcohol dissolves glycerol but at which the polyglycerols are relatively insoluble in said alcohol. The extract contains most of the glycerol in the mixture with very little salt, say about 0.5% of the total salt originally present in the foots, and the heavier raffinate largely comprises polyglycerols with a small amount of salt, say about 3.5% of the total salt originally present. In each extraction, the extract can be separated from the raffinate either during the extraction by means of a continuous extraction apparatus or after completition of the extraction by gravity separation, such as centrifuging, decanting the lighter extract layer or withdrawing the heavier raffinate layer, or other suitable methods.

In an alternative method of carrying out the separation, the foots are extracted with a solvent comprising an alcohol having three to about six carbon atoms per molecule; the alcohol extract is separated from the raffinate, and the solvent is removed therefrom to give glycerol almost free from salt. The raffinate may then be extracted with ethanol or methanol to dissolve the polyglycerols with less than 4% of the salt originally present in the foots, whereafter the polyglycerols may be used for chemical synthesis or may be split to regenerate glycerol; or the raffinate may be discarded without recovering polyglycerols therefrom, depending upon economic factors.

In selecting an alcohol having three to about six carbon atoms for dissolving the glycerol, aliphatic monohydric alcohols are preferably employed, particularly the saturated primary alcohols. Suitable alcohols for use in the process include the propyl alcohols, (n-propyl alcohol and isopropyl alcohol), the butyl alcohols (n-butyl alcohol, isobutyl alcohol, secondary butyl alcohol and tertiary butyl alcohol), the amyl alcohols, the hexyl alcohols, etc., and mixtures of these alcohols. Normal propanol and/or butanol are particularly satisfactory as solvents for the glycerol and are employed at temperatures of about 50° C. to about 100° C., and preferably at about 70° C. to about 90° C. When employing normal pentanol or hexanol, temperatures of about 80° C. to about 125° C., and preferably of about 90° C. to about 110° C., are used. A mixture of 1 part of isopropanol and 3 parts of normal butanol has also given very satisfactory results at temperatures up to 100° C.

The glycerine foots are normally very viscous and are washed out of the glycerine still. In the present process, it is preferred to wash the foots out with an alcohol, preferably a portion of the alcohol with which the material is to be first extracted, so that no water is added to the foots. If the foots are washed out with water, the water is removed before extraction, because the salts are more soluble in alcohol solutions containing water and because the presence of water reduces the selectivity of the process. However, even as much as about 10% of water or higher, based on the volume of alcohol used, does not make the process inoperable.

The following examples are illustrative of the present invention, but the invention is not limited thereby.

Example I

Glycerine foots remaining after the distillation of crude glycerine obtained from a soap-making process are washed out of the still with substantially anhydrous ethyl alcohol. More of the ethyl alcohol is then added in sufficient amount so that the liquid body contains about 300 parts by weight of ethyl alcohol to 100 parts of glycerine foots. The materials are thoroughly mixed together, and the mixture is filtered to remove precipitated salts. The precipitate amounts to about 6.5 parts and is about 90% sodium chloride. The ethyl alcohol extract is distilled to remove the alcohol, leaving a viscous liquid comprising glycerol and polyglycerols. The viscous liquid is mixed with a portion of normal butanol at about 70° C., using about 300 parts of butanol to the 93.5 remaining parts of the viscous liquid. The mixture is allowed to stand until a clear separation into two layers is obtained. The heavier viscous layer is withdrawn and extracted with a second portion of about 300 parts of normal butanol. After again withdrawing the lower viscous layer, the two upper layers are combined, and butanol is removed by distillation. After removal of the butanol, about 30 parts by weight of liquid remains in the distillation vessel, and this liquid is approximately 92% glycerine, 6.5% polyglycerols and 1.5% salt. This liquid is returned to the glycerine stills to be redistilled with fresh portions of crude glycerine. The lower viscous layer or raffinate comprises about 55 parts of polyglycerols, 5 parts of glycerine and 3.5 parts of salt.

Example II

Glycerine foots obtained from the same source as in Example I are washed out of the glycerine still with water. The foots are acidified to a pH of 3.3 with hydrochloric acid and allowed to stand; free fatty acids are removed by filtration; ferric chloride is added to the filtrate to precipitate insoluble iron soaps until further additions cause no further precipitation, and the insoluble soaps are filtered off. The solution is then brought to a pH of 8.0 with sodium hydroxide, is filtered and is passed to a drum drier for removal of water. About 100 parts by weight of the resulting viscous liquid is mixed with 50 parts of isopropanol and 150 parts of n-butanol, and the mixture is heated to about 80° C. and allowed to stand until a sharp separation of layers is obtained. The upper layer is decanted off, and the lower layer is mixed with an additional 50 parts of isopropanol and 150 parts of n-butanol and again heated to 80° C. and allowed to stand. The upper isopropanol-butanol extract layer is removed and combined with the upper layer previously decanted. The isoproponal-butanol solution is then distilled to remove the isopropyl and butyl alcohols, and the remaining liquid is about 93% glycerol, which can be used commercially for many purposes without further treatment. The raffinate, largely comprising polyglycerols, is discarded.

Although the present invention has been described with reference to particular embodiments and examples, it will be apparent to those skilled in the art that variations and modifications of this invention can be made and that equivalents can be substituted therefor without departing from the principles and true spirit of the invention.

We claim:

1. The process which comprises separating glycerol from polyglycerol by extracting a mixture containing glycerol and polyglycerol at an elevated temperature with a solvent comprising an aliphatic monohydric alcohol having three to six carbon atoms per molecule, said elevated temperature being within the range where glycerol is miscible with said solvent but where polyglycerols are relatively insoluble, there being less than about 10% of water present, based on the volume of alcohol used, during said extraction.

2. A process for recovering glycerol from glycerine foots containing glycerol and polyglycerols which comprises treating glycerine foots with a solvent comprising an aliphatic monohydric alcohol having three to six carbon atoms per molecule at a temperature at which the glycerol is miscible with said solvent but at which polyglycerols are relatively insoluble therein whereby two liquid layers are formed, there being less than about 10% of water present, based on the volume of alcohol used, during said treatment; separating said layers; and removing said solvent from the upper layer.

3. A process for recovering glycerol from glycerine foots containing glycerol and polyglycerols which comprises extracting glycerol with propyl alcohol at about 50° C. up to about 100° C., there being less than about 10% of water present, based on the volume of alcohol used, during said extraction; and removing the propyl alcohol from the extract.

4. A process for recovering glycerol from glycerine foots containing glycerol and polyglycerols which comprises extracting glycerol with butyl alcohol at about 50° C. up to about 100° C., there being less than about 10% of water present, based on the volume of alcohol used, during said extraction; and removing the butyl alcohol from the extract.

5. A process for separately recovering glycerol and polyglycerols from glycerine foots which comprises extracting glycerine foots with a solvent comprising an alcohol having not more than two carbon atoms per molecule whereby an extract containing glycerol and polyglycerols is separated from salts present in the foots, removing the solvent from said extract to leave a residue comprising glycerol and polyglycerols, and extracting said residue at an elevated temperature with a second solvent comprising an aliphatic monohydric alcohol having three to six carbon atoms per molecule to obtain a second extract containing a major portion of the glycerol and a raffinate containing a major portion of the polyglycerols, said elevated temperature being within the range where glycerol is miscible with said solvent but where polyglycerols are relatively insoluble therein.

6. A process for separately recovering glycerol and polyglycerols from glycerine foots which comprises extracting glycerine foots with a solvent comprising an alcohol having not more than two carbon atoms per molecule whereby an extract containing glycerol and polyglycerols is produced and salts present in the foots are precipitated; separating said precipitated salts from said extract; removing the solvent from said extract to leave a residue comprising glycerol and polyglycerols; extracting said residue with a second solvent comprising a saturated, aliphatic, primary, monohydric alcohol having three to six carbon atoms per molecule at an elevated temperature to obtain a second extract containing a major portion of the glycerol and a raffinate containing a major portion of the polyglycerols, said elevated temperature being within the range of about 50° C. to about 100° C. for alcohols having 3 and 4 carbon atoms and within the range of about 80° C. to about 125° C. for alcohols having 5 and 6 carbon atoms; separating the second extract from the raffinate; and removing the second solvent from the second extract whereby glycerol relatively free from polyglycerols and salts is produced.

7. A process for separately recovering glycerol and polyglycerols from glycerine foots which comprises extracting glycerine foots with an alcohol having not more than two carbon atoms per molecule whereby an extract containing glycerol and polyglycerols is separated from salts present in the foots, removing said alcohol from the extract to leave a residue comprising glycerol and polyglycerols, extracting said residue with n-propyl alcohol at about 50° C. to about 100° C. to obtain a second extract containing a major portion of the glycerol and a raffinate containing a major portion of the polyglycerols, and removing the n-propyl alcohol from the second extract whereby glycerol relatively free from polyglycerols and salts is produced.

8. A process for separately recovering glycerol and polyglycerols from glycerine foots which comprises extracting glycerine foots with an alcohol having not more than two carbon atoms per molecule whereby an extract containing glycerol and polyglycerols is separated from salts present in the foots, removing said alcohol from the extract to leave a residue comprising glycerol and polyglycerols, extracting said residue with n-butyl alcohol at about 50° C. to about 100° C. to obtain a second extract containing a major portion of the glycerol and a raffinate containing a major portion of the polyglycerols, and removing the n-butyl alcohol from the second extract whereby glycerol relatively free from polyglycerols and salts is produced.

9. A process for recovering polyglycerols from a crude mixture containing glycerol, polyglycerols and salts which comprises extracting the mixture with a solvent comprising an aliphatic monohydric alcohol having three to six carbon atoms per molecule at an elevated temperature to obtain an extract containing a major portion of the glycerol and a raffinate containing a major portion of the polyglycerols and salts, there being less than about 10% of water present, based on the volume of alcohol used during said extraction, said elevated temperature being within the range where glycerol is miscible with said solvent but where polyglycerols are relatively insoluble therein; separating said raffinate from said extract; extracting said raffinate with a second solvent comprising an alcohol having not more than two carbon atoms per molecule whereby a second extract containing polyglycerols is produced and salts are precipitated; separating the precipitated salts from said second extract; and removing the second solvent from the second extract whereby polyglycerols relatively free of salts are produced.

GERALD INMAN KEIM.
JOHN ROSS.
JOSEPH HENRY PERCY.

REFERENCES CITED

The following references are of record in the file of this patent:

FOREIGN PATENTS

| Number | Country | Date |
|---|---|---|
| 525,315 | Great Britain | Aug. 26, 1940 |
| 696,822 | Germany | Sept. 30, 1940 |